United States Patent [19]

Hirama et al.

[11] Patent Number: 4,680,919
[45] Date of Patent: Jul. 21, 1987

[54] ARTICLE DELIVERY TRANSFERRING DEVICE IN A COLLECTIVE PACKING MACHINE

[76] Inventors: Shigemitsu Hirama, 9-34, Komagome 4 chome, Toshima-ku, Tokyo 170; Satoru Aida, 106-6, Nishinaka, Sanjo-shi, Niigata 955; Hideo Soyama, 2-A-13, Takasu-cho 1 chome, Kamo-shi, Niigata 959-13, all of Japan

[21] Appl. No.: 896,330

[22] Filed: Aug. 14, 1986

Related U.S. Application Data

[63] Continuation of Ser. No. 634,385, Jul. 25, 1984, abandoned.

[30] Foreign Application Priority Data

Jul. 28, 1983 [JP] Japan .................................. 58-138608

[51] Int. Cl.[4] ............................................. B65B 57/10
[52] U.S. Cl. ........................................ 53/499; 53/531; 198/425; 198/426
[58] Field of Search .................. 53/53, 54, 56, 148, 53/494, 495, 498, 499, 531; 198/425, 426, 428, 429, 430

[56] References Cited

U.S. PATENT DOCUMENTS

| | | |
|---|---|---|
| 2,738,116 | 3/1956 | Barraclough . |
| 2,939,255 | 6/1960 | Kinney .................. 53/498 X |
| 2,997,829 | 8/1961 | Johnson ................ 53/499 X |
| 3,105,334 | 10/1963 | Marshall ............... 53/491 X |
| 3,365,857 | 1/1968 | Liedtke .................. 53/148 |
| 3,466,835 | 9/1969 | Temple .................. 53/495 X |
| 3,570,209 | 3/1971 | Salwasser . |
| 3,771,279 | 11/1973 | Seragnoli ............... 53/56 |
| 4,135,344 | 1/1979 | Seragnoli ............... 53/54 |
| 4,506,493 | 3/1985 | Horton .................. 53/499 |
| 4,511,045 | 4/1985 | Seragnoli ............... 53/54 X |

FOREIGN PATENT DOCUMENTS 0036398 9/1981 European Pat. Off. .

Primary Examiner—Robert L. Spruill
Assistant Examiner—Steven P. Weihrouch

[57] ABSTRACT

An article delivery transferring device in a collective packing machine of stop waiting operation control system is provided. Said collective packing machine comprises a main packing machine and an auxiliary packing machine each having an individual driving source, wherein articles from the main packing machine in continuous operation are delivered and transferred to the auxiliary packing machine in stop waiting operation, characterized in that a grasping belt having an individual driving source is arranged on both sides of an article conveying path between the main packing machine and the auxiliary packing machine and belt traveling speed of the grasping belt is matched to operation speed of the main packing machine, article detecting sensors to detect passing articles are disposed at midway of the article conveying path, decision regarding whether or not the continuous operation of the auxiliary packing machine is possible can be performed early using the grasping belt and the article detecting sensors, whereby the auxiliary packing machine in matched and synchronous operation can be operated continuously at high speed.

3 Claims, 7 Drawing Figures

ARTICLE DELIVERY TRANSFERRING DEVICE IN A COLLECTIVE PACKING MACHINE

This application is a continuation of application Ser. No. 634,385, filed July 25, 1984, now abandoned.

BACKGROUND OF THE INVENTION

The present invention relates to an article delivery transferring device in a collective packing machine having a sequential operation control system. Articles are fed continuously at regular intervals and in predetermined amounts from a main packing machine (front packing machine) in continuous operation to an auxiliary packing machine (rear packing machine) actuated when articles in the required number are received. After completing one cycle of auxiliary packing the auxiliary packing machine is stopped at a definite position.

An article delivery transferring device in a collective packing machine of stop waiting control system in the prior art is shown in FIGS. 5 through 7.

In the prior art device, a plurality of in-line articles 3 stacked in two levels are fed from a main packing machine 1 to a conveyor plate 2 at regular intervals and then pushed with a pusher 4 of the main packing machine 1 onto an article conveying path 5 on the conveyor plate 2. This process is repeated and articles are transferred by pushing in sequence onto the article conveying path 5. When an article 3 on the top level abuts a stopper 6 and is thereby detected with a transfer completion detecting sensor 7, the detected signal actuates a lifting and turning plate 8 that moves upwards to lift the articles 3 of n lines (e.g., n=5 as shown in FIG. 6). A feed pusher 9 projects and pushes the articles at the upper limit and feeds them onto a packing path 11 of an auxiliary packing machine 10 as shown in FIG. 7. After transferring the articles, the feed pusher 9 returns to its FIG. 7 position. Simultaneously, lifting and turning plate 8 rotates 90 degrees in a horizontal plane into the phantom line position of FIG. 5; plate 8 is then lowered and then rotated 90 degrees back to its said line position as shown in FIGS. 5 and 6 and stopped at the original position below the conveyor plate 2. Thus the articles 3 in two stages by five lines are packed in collective packing at the conveying path.

In such an article delivery transferring device in a collective packing machine of sequential operation control system in the prior art, relation between time $t_{A1}$ (or rotation angle $A_1$ degree) while the article 3 on the top line abuts on the stopper 6 and is detected by the transfer finishing detecting sensor 7 and the lifting and turning plate 8 begins to move upwards and attains to level where the bottom surface of the lifting and turning plate 8 does not interfere with feeding of the articles 3 and time $t_{A2}$ (or rotation angle $A_2$ degree) while the article 3 is fed and pushed by the pusher 4 and abuts on the article 3 at front line which is transferred at pushed state must be as follows:

$$t_{A2} > t_{A1}$$

This condition applies not only to the transferring structure at pushed state in the prior art. The relation between the time $t_{A1}$ for the lifting and turning plate 8 to attain to level where interference does not occur and the time $t_{A2}$ for the subsequent article 3 to be fed restricts any transferring structure.

If this restriction is not satisfied, at the lifting operation of the articles 3 by the lifting and turning plate 8 the article 3 on 6th line ((n+1)th line in the case of packing at n lines) collides with the top end of the lifting and turning plate 8 obstructing smooth operation.

Since the stop waiting operation control system has disadvantage of being not suitable for high speed operation, if continuous operation is intended to eliminate such disadvantage, possibility of continuous operation must be determined regarding whether or not the article 3 on 5th line (nth line in the case of collective packing at n lines) comes to the auxiliary packing machine 10, whether or not the auxiliary packing machine is in region to enable the continuous operation required in mechanism, and whether or not the auxiliary packing machine 10 is in stop region at definite position required in mechanism. In order to advance high speed operation further and obtain accuracy in the possibility decision, it is required that the decision may be performed early with time margin.

In the transferring structure at pushed state in the prior art, however, decision may be performed only by detection of the article 3 at the projection stroke position of the pusher 4 or the transferring operation at pushed state. If possibility of the continuous operation is determined after confirming the feed state of the product 3 from the main packing machine 1, the high speed operation is limited naturally in time relation and the decision is apt to become inaccurate and false decision may occur.

Further in the transferring structure at pushed state, position of the pushed article is apt to become inaccurate, and when the articles are transferred at stacked state in several stages, e.g. two stages, trouble such as the stage misalignment is apt to occur and therefore disadvantage exists also in mechanism.

SUMMARY OF THE INVENTION

An object of the present invention is to provide an article delivery transferring device in a collective packing machine of stop waiting operation control system where disadvantages in the prior art are eliminated.

Feature of the invention is in an article delivery transferring device in a collective packing machine of stop waiting operation control system, said collective packing machine comprising a main packing machine and an auxiliary packing machine each having an individual driving source, wherein articles from the main packing machine in continuous operation are delivered and transferred to the auxiliary packing machine in stop waiting operation, characterized in that a grasping belt having an individual driving source is arranged on both sides of an article conveying path between the main packing machine and the auxiliary packing machine and belt traveling speed of the grasping belt is matched to operation speed of the main packing machine, article detecting sensors to detect passing articles are disposed at midway of the article conveying path, decision regarding whether or not the continuous operation of the auxiliary packing machine is possible can be performed early using the grasping belt and the article detecting sensors, whereby the auxiliary packing machine in matched and synchronous operation can be operated continuously at high speed.

DETAILED DESCRIPTION OF THE EMBODIMENTS

Figure 1:
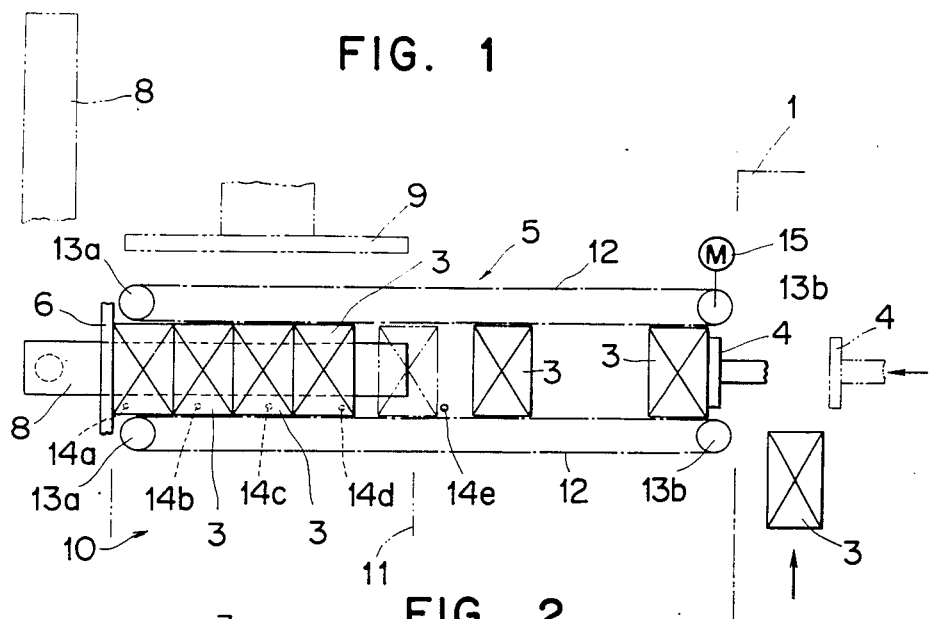
FIG. 1 is a plan view of main part of an embodiment of the invention.
Figure 2:
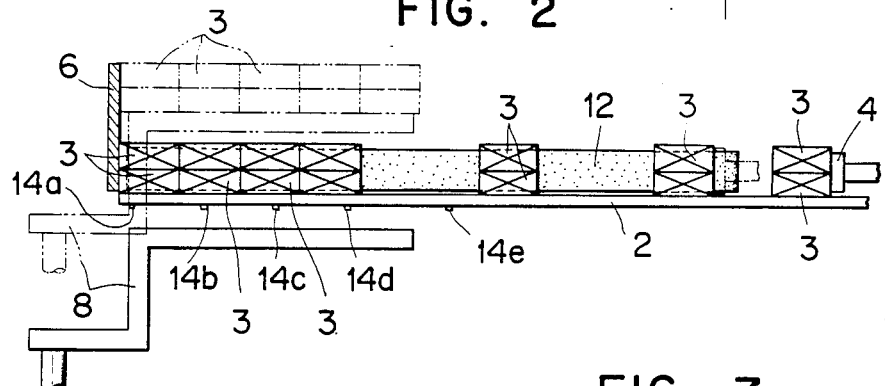
FIG. 2 is a sectional view of the embodiment in lateral direction.
Figure 3:
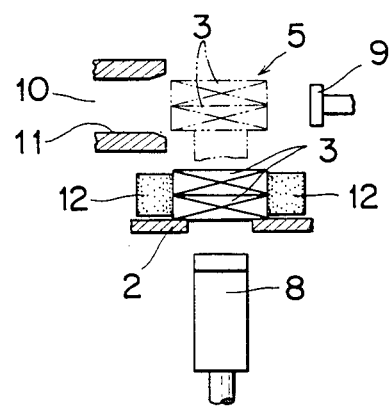
FIG. 3 is a sectional view of the embodiment in longitudinal direction.
Figure 7:
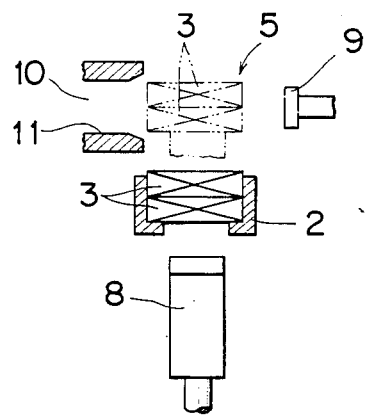
FIG. 7 is a sectional view of the prior art in longitudinal direction.
Figure 4:
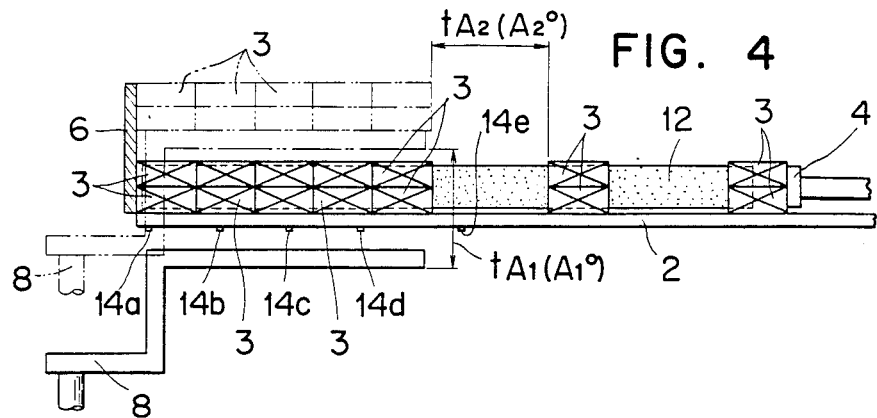
FIG. 4 is a sectional view of the embodiment in lateral direction.
Figure 5:
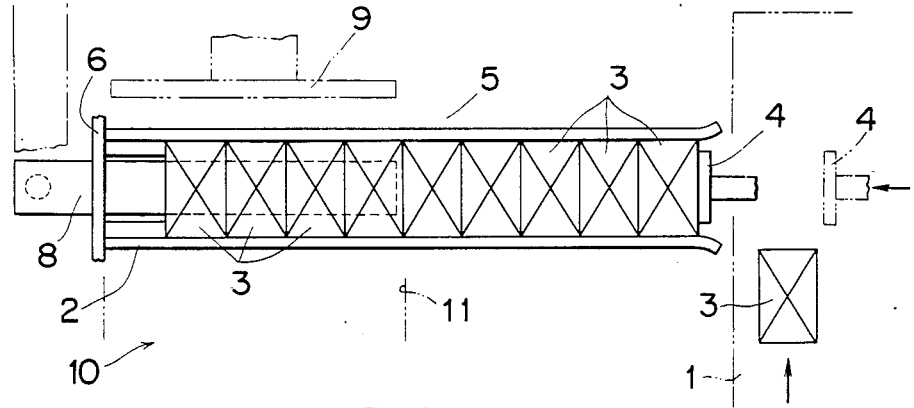
FIG. 5 is a plan view of an example in the prior art.
Figure 6:
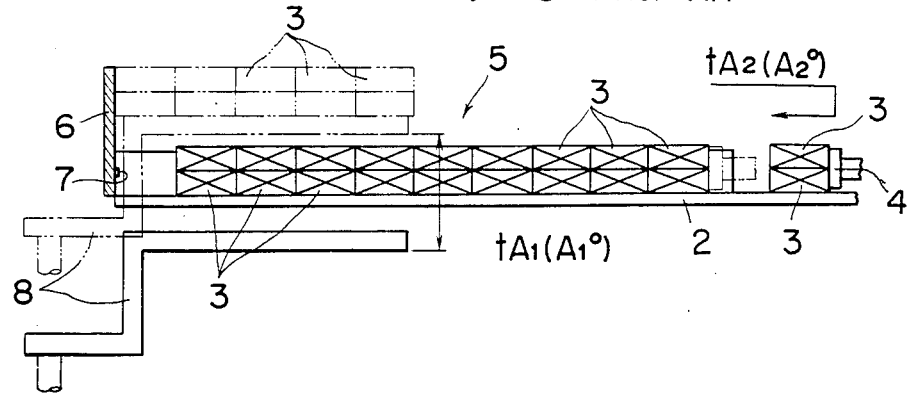
FIG. 6 is a sectional view of the prior art in lateral direction.

The invention will now be described specifically by way of an embodiment referring to the accompanying drawings of FIGS. 1 through 4. Like parts to those in conventional example are designated by identical reference numerals.

The embodiment is a collective packing machine to perform collective packing of articles 3 in two stages by five lines (n lines in general) as in the conventional example.

The embodiment has similar operating structure to that of the conventional example except for a delivery transferring member.

A grasping belt 12 of the embodiment extends along both sides of an article conveying path 5 between a front roller 13a and a rear roller 13b, the width of the belt is nearly as large as height of two articles.

Article detecting sensors 14a, 14b, 14c, 14d, 14e (photo sensors in this case) of five in number (n in the case of collective packing at n lines) are used. The article detecting sensors 14a, 14b, 14c, 14d (on 1st through (n−1)th lines in the case of collective packing at n lines) are disposed to detect articles at definite positions without gap, and the article detecting sensor 14e (on nth line in the case of collective packing at n lines) is disposed to detect the article slightly earlier than its attaining a transfer position.

Each installation pitch of the article detecting sensors 14a, 14b, 14c, 14d, 14e is made broader than width of the articles 3 of one line so as to avoid simultaneous action regarding the identical article 3.

The belt traveling speed of the grasping belt 12 is matched with the main packing machine 1.

Consequently, if synchronization of the main packing machine 1 with the auxiliary packing machine 11 is maintained, the time required for the article on the nth line to actuate the article detecting sensor 14e becomes constant in phase angle of the main packing machine 1 and the auxiliary packing machine 11 irrespective of the belt traveling speed. Travel amount of the grasping belt 12 shall be specified so that when the article 3 on nth line, 5th line in this case, passes through the article detecting sensor 14e and the continuous operation enabling signal is generated, the article 3 at least on (n−1)th line, 4th line in this case, has attained its transfer position.

The travel amount must also follow the speed variation of the main packing machine 1 and the auxiliary packing machine 10. Therefore the grasping belt 12 has an individual driving source 15 being variable for matching.

Since articles 3 on 1st through (n−1)th lines are confirmed by travel amount of the grasping belt 12 and the article 3 on nth line is detected earlier than attaining its definite position the, transferring state of the article 3 corresponding to nth line (5th line in this case) from the main packing machine 1 can be determined early and accurately in the auxiliary packing machine 10 thereby continuous operation of the auxiliary packing machine 10 is enabled even at high speed operation.

Although the embodiment discloses horizontal transferring system of articles, it may be applied also to vertical transferring system.

In the present invention as above described, a grasping belt having an individual driving source is arranged on both sides of an article conveying path between the main packing machine and the auxiliary packing machine and belt traveling speed of the grasping belt is matched to operation speed of the main packing machine, and article detecting sensors to detect passing articles are disposed at midway of the article conveying path, thereby stable transferring action without the stage misalignment can be performed at the grasping belt 12. Moreover, since the article detecting sensors 14a, 14b, 14c, 14d, 14e are used and particularly the sensor 14e can detect the article on nth line (5th line in this case) early, delay of the auxiliary packing machine 10 at first cycle from the stop waiting state caused by clutch slip may be made to satisfy the condition (1) $t_{A2} > t_{A1}$ by generating the operation starting signal early with respect to the main packing machine 1 without increasing speed of the auxiliary packing machine 10 in comparison to the main packing machine 1.

Since possibility of continuous operation can be determined early, decision of the continuous operation is easily performed even at high speed operation and therefore the continuous operation control is made easy. Furthermore, since the article 3 is grasped and transferred, position of the pushed article is made accurate and generation of trouble such as the stage misalignment can be prevented previously.

Thus the invention can attain the desired object fully.

What is claimed is:

1. In an article delivery transferring device of a collective packing machine comprising a main packing machine and an auxiliary packing machine each having an individual driving source, wherein articles from the main packing machine in continuous operation are delivered and transferred to the auxiliary packing machine in batch sequence, the improvement comprising a grasping belt means arranged along an article conveying path between the main packing machine and the auxiliary packing machine, said belt means being arranged for grasping and directing said articles along said path and means for driving said grasping belts at a belt traveling speed corresponding to the operational speed of the main packing machine, and article detecting sensor means for detecting passage of a predetermined number (n) of articles along the article conveying path, said article detecting sensor means comprising a predetermined number (n) of sensors corresponding to said predetermined number (n) of articles and arranged along the article conveying path, and wherein the nth sensor is placed a predetermined distance upstream from the transferring device and along the article conveying path which predetermined distance is sufficient to provide early indication as to the passage of the nth article towards the transferring device prior to said nth article reaching a stationary transfer position in abutting end to end contact with the (n−1)th article, said nth sensor generating a signal upon sensing said nth article for starting the auxiliary packing machine to provide continuous high speed synchronous operation of both the auxiliary packing machine and the main packing machine.

2. The transferring device of claim 1, wherein the first n'1 sensors are spaced a distance from each other along the article conveying path such that each sensor will only detect the presence of one article when it arrives to a definite transferring position adjacent the other articles to be transferred.

3. The transferring device of claim 1, wherein the belt traveling speed of said grasping belts is matched to a conveyor speed of the main packing machine.

* * * * *

UNITED STATES PATENT AND TRADEMARK OFFICE
CERTIFICATE OF CORRECTION

PATENT NO. : 4,680,919

DATED : July 21, 1987

INVENTOR(S) : Shigemitsu HIRAMA et al

It is certified that error appears in the above-identified patent and that said Letters Patent is hereby corrected as shown below:

On the cover page, between lines [75] and [21], please insert the following,

--[73] Assignee: Japan Tobacco Inc., and
Sanjo Machine Works Ltd., JAPAN--

Signed and Sealed this

Sixteenth Day of February, 1988

Attest:

DONALD J. QUIGG

Attesting Officer

Commissioner of Patents and Trademarks